Patented Dec. 4, 1928.

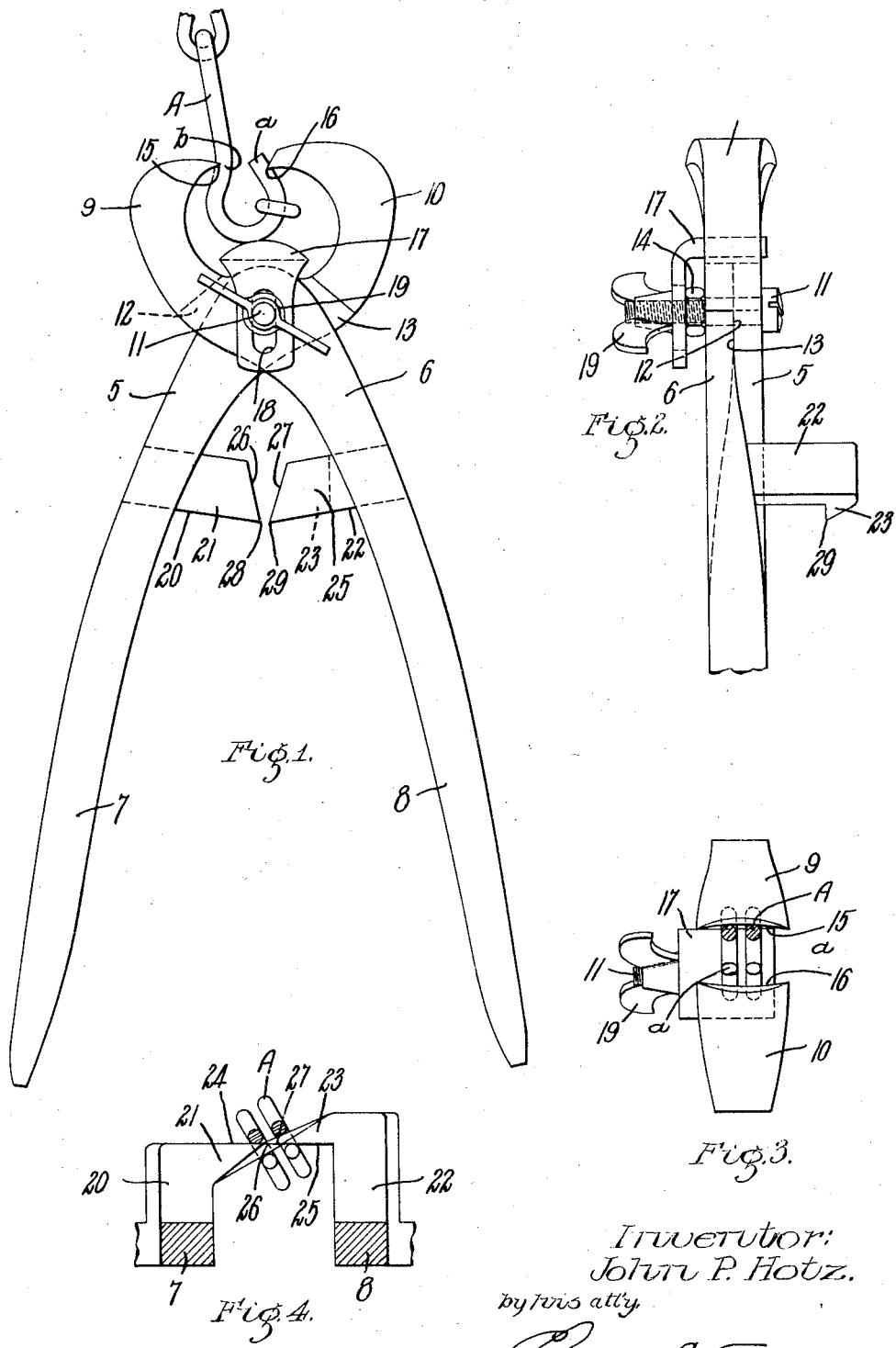

1,693,755

UNITED STATES PATENT OFFICE.

JOHN P. HOTZ, OF BOSTON, MASSACHUSETTS, ASSIGNOR OF ONE-HALF TO MANTON A. WOOD, OF BOSTON, MASSACHUSETTS.

TIRE-CHAIN TOOL.

Application filed November 1, 1926. Serial No. 145,422.

This invention relates to a tool, and particularly to a tool adapted to be utilized in repairing anti-skid chains used upon automobile tires.

The object of the invention is to provide a tool which may be utilized for opening certain of the links that are employed in fastening sections of a tire chain together, so that a section may be removed and replaced, and also for closing said links so that said chain sections cannot become separated.

Another object of the invention is to provide an adjustable stop positioned between the jaws of the tool and against which an end of a link may abut when said link is being closed.

The invention consists in a tool as set forth in the following specification and particularly as pointed out in the claim thereof.

Referring to the drawings:

Figure 1 represents a front elevation of a tool embodying my invention, the gripping jaws of said tool being partly opened and having a link of a chain positioned therebetween.

Fig. 2 is a side elevation of the tool as viewed from the right of Figure 1, a portion of the handle being broken away to save space in the drawings.

Fig. 3 is an end view of the gripping jaws, a link of a chain being illustrated in position therebetween.

Fig. 4 is a detail section illustrating the wedges of the tool co-operating to open a link.

Like numerals refer to like parts throughout the several views of the drawings.

In the drawings, 5 and 6 represent a pair of interengaging levers having handles 7 and 8 respectively and jaws 9 and 10 respectively. The levers 5 and 6 are pivoted together intermediate the ends thereof upon a screw 11, and the opposite engaging faces of said levers are cut away and flattened at 12 and 13 respectively and are clamped together by a nut 14 having screw-threaded engagement with the pivot screw 12. The jaw 9 terminates in a curved edge portion 15 and in like manner the jaw 10 terminates in a curved edge portion 16, and said edge portions are oppositely disposed to each other and co-operate with each other in gripping a link A and holding the same in position, while an end portion $a$ of said link is closed against an intermediate portion $b$ of said link.

As an aid in holding the link A in position during the closing operation, a stop 17 is provided mounted upon the pivot screw 11 at the side of the lever 6 and projecting between the jaws 9 and 10. The stop 17 has a slot 18 formed therein, through which the pivot 11 projects and permitting said stop to be adjusted upon said pivot. The stop 17 is clamped against the end of the nut 14 by a thumb nut 19 which also has screw-threaded engagement with the pivot screw 11. The stop 17 may be adjusted longitudinally of the tool, or said stop may be rocked a limited amount upon the pivot 11 between the jaws 9 and 10.

Projecting laterally from the handle 7 is an arm 20 which terminates in a wedge portion 21. In like manner an arm 22 projects laterally from the handle 8 and terminates in a wedge portion 23. The wedge portions 21 and 23 are located out of alignment with the handles and are oppositely disposed to each other and have flat surfaces 24 and 25 respectively adjacent to each other and adapted to wipe one against the other as the handles 7 and 8 are opened and closed. The wedges 21 and 23 also have edge portions 26 and 27 respectively, which converge toward each other, and said edge portions co-operate with adjacent sides of their respective wedges to form points 28 and 29.

In utilizing the wedges 21 and 23 to separate the portion $a$ of a link A from the portion $b$ of said link, said wedges are applied to the link, as illustrated in Fig. 4, and pressure upon the handles 7 and 8, tending to force said handles toward each other, will cause the points 28 and 29 and edges 26 and 27 of said wedges to co-operate and apply pressure in opposite directions and force said portions of said link apart.

The general operation of the tool hereinbefore specifically described is as follows:—When it becomes necessary to spread a link so that a link interlocking therewith may be removed therefrom, the wedges 21 and 23 of the tool are inserted between the portions $a$ and $b$ of the link, as hereinbefore mentioned, and pressure is applied to the handles 7 and 8 in a manner to force said wedges toward each other to open said link. When it is desired to again force the portion a of the link against the portion b thereof, the link is inserted between the jaws 9 and 10 and against the stop 17 which is adjusted upon the pivot 11 to accommodate said link, and pressure is applied to the handles 7 and 8 in a manner to force the jaws 9 and 10 toward each other. During the act of closing the link, the latter is held firmly in place by the curved edges 15 and 16 of the jaws.

I claim:—

In a tool of the character described a pair of levers pivoted together intermediate the ends thereof, each of said levers embodying therein a handle and a jaw, said jaw having a curved gripping edge, a stop mounted upon the pivot for said levers and projecting between said jaws, means to clamp said stop upon said pivot, an arm projecting laterally from each of said handles, and a wedge upon each of said arms adapted to cooperate with each other to apply pressure in opposite directions to an article inserted therebetween.

In testimony whereof I have hereunto set my hand.

JOHN P. HOTZ.